(12) United States Patent
Lohner et al.

(10) Patent No.: US 6,446,490 B1
(45) Date of Patent: Sep. 10, 2002

(54) METHOD AND DEVICE FOR DETERMINING THE PRESSURE IN BRAKE SYSTEMS

(75) Inventors: Herbert Lohner, Friolzheim; Peter Dominke, Bietigheim-Bissingen; Chi-Thuan Cao, Korntal-Muenchingen; Karl-Josef Weiss, Stuttgart; Helmut Wiss, Moeglingen; Andreas Zierhut, Obersulm; Jens Fiedler, Thoumassing, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/622,739

(22) PCT Filed: Dec. 18, 1999

(86) PCT No.: PCT/DE99/04043
§ 371 (c)(1),
(2), (4) Date: Dec. 13, 2000

(87) PCT Pub. No.: WO00/38966
PCT Pub. Date: Jul. 6, 2000

(30) Foreign Application Priority Data

Dec. 28, 1998  (DE) .......................... 198 60 365

(51) Int. Cl.$^7$ .......................... B60T 8/04; B60T 15/14; G01L 5/28; G01M 3/02; G01N 7/00
(52) U.S. Cl. .................. 73/39; 73/39; 73/121; 303/11; 303/39
(58) Field of Search ............................. 73/39, 37, 121; 73/130; 303/86, 3, 11, 34, 39

(56) References Cited

U.S. PATENT DOCUMENTS

| | | | | |
|---|---|---|---|---|
| 2,674,121 A | * | 4/1954 | Gorman | 73/39 |
| 3,901,562 A | * | 8/1975 | Powell et al. | 303/86 |
| 4,062,224 A | * | 12/1977 | Zeleney | 73/39 |
| 4,440,015 A | * | 4/1984 | Hann | 73/39 |
| 4,755,008 A | * | 7/1988 | Imoto et al. | 303/110 |
| 4,870,390 A | * | 9/1989 | Hosoda et al. | 340/453 |
| 5,808,909 A | * | 9/1998 | Rees | 364/558 |
| 6,081,767 A | * | 6/2000 | Witt et al. | 702/55 |
| 6,142,581 A | * | 11/2000 | Yamaguchi et al. | 303/113.2 |
| 6,227,625 B1 | * | 5/2001 | Gaughan | 303/15 |
| 6,269,682 B1 | * | 8/2001 | Vaughn | 73/39 |

FOREIGN PATENT DOCUMENTS

| | | |
|---|---|---|
| DE | 39 16 672 | 11/1990 |
| DE | 40 30 724 | 4/1992 |
| DE | 43 40 921 | 6/1995 |
| DE | 196 09 869 | 9/1996 |
| DE | 195 28 697 | 2/1997 |
| DE | 196 32 311 | 2/1998 |
| DE | 198 36 686 | 12/1999 |

* cited by examiner

*Primary Examiner*—Hezron Williams
*Assistant Examiner*—David J. Wiggins
(74) *Attorney, Agent, or Firm*—Kenyon & Kenyon

(57) ABSTRACT

Device and method for determining a wheel braking pressure and/or an admission pressure in a braking system in which pressure medium is introduced from a reservoir for the pressure medium having an admission pressure into a wheel brake through at least one shutoff device for inlet and/or outlet and/or passage of a pressure medium, it being possible to remove pressure medium from the wheel brake through at least one means delivering the pressure medium. In so doing, a pressure quantity representing the admission pressure is estimated, at least one operating state of at least one actuator in the braking system is detected and the wheel braking pressure is estimated as a function of the estimated admission pressure and the detected operating states.

16 Claims, 11 Drawing Sheets

METHOD AND DEVICE FOR DETERMINING THE PRESSURE IN BRAKE SYSTEMS

BACKGROUND INFORMATION

Figure 1:
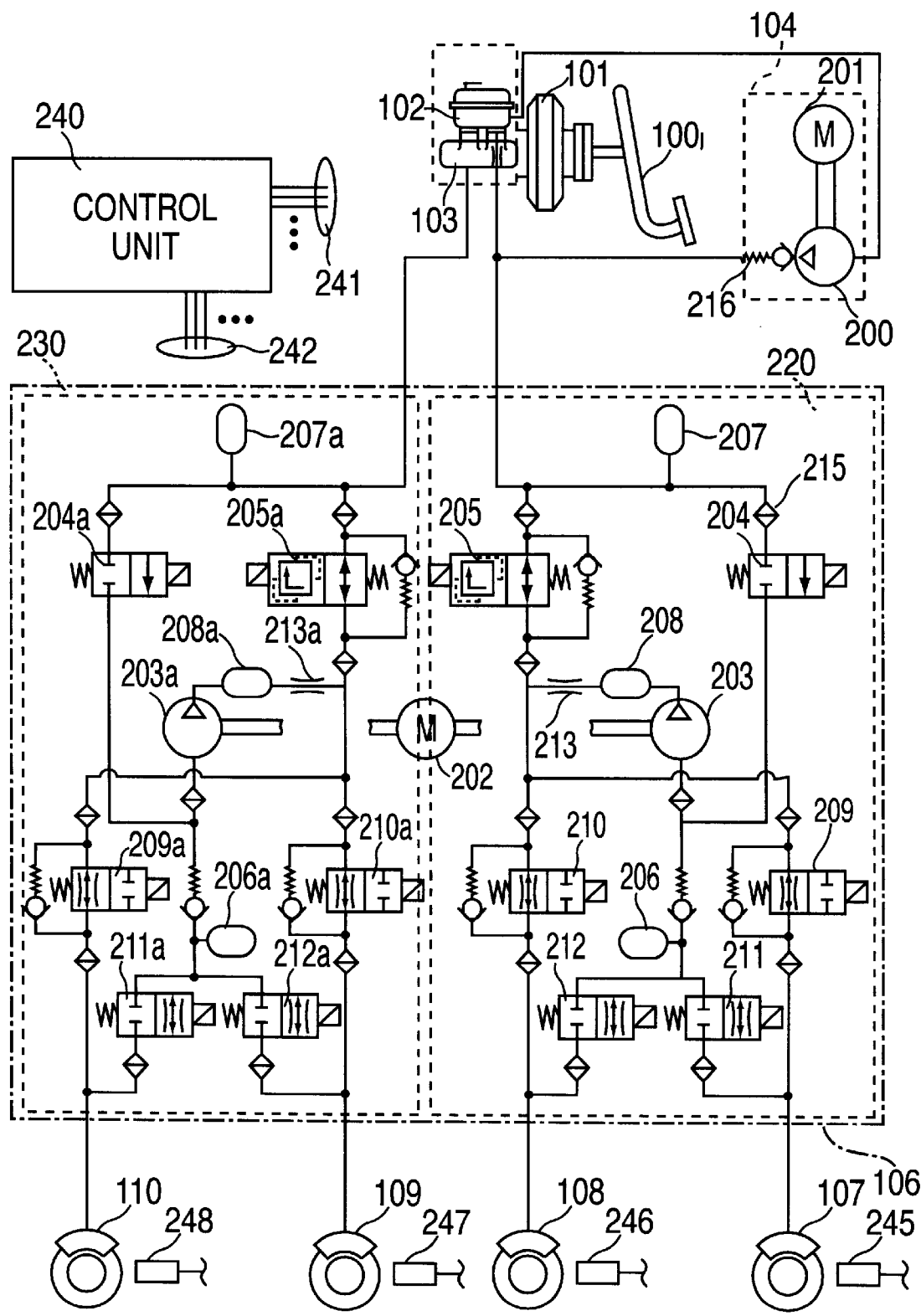

The invention relates to a method and a device for determining pressure quantities, in particular, those of a wheel braking pressure and/or an admission pressure in a braking system of a vehicle having an antilock braking system (ABS) and/or traction control system (TCR) and/or electronic stability program (ESP), in accordance with the precharacterizing portions of the independent claims.

A braking pressure control system is known from German Patent Application 40 30 724 A1 in which desired braking pressures are determined for the wheel brake cylinders based on measured values and estimated values. Activation times for a hydraulic system having inlet valves are determined from the desired braking pressures using a hydraulic model. The actual braking pressure in the wheel brake cylinder is estimated from the brake circuit pressure, which is assumed to correspond to the admission pressure of the braking system measured by a sensor, and the activation times of the valves assigned to the individual brakes using a hydraulic model. Moreover, it is necessary to use pressure sensors in the braking system, an admission pressure sensor, in particular.

German Patent Application 43 40 921 A1 subsequently shows a concrete embodiment in the form of a special mathematical relation for estimating the brake circuit pressure for each brake circuit. In doing so, higher brake circuit pressures than can be produced by the driver are obtained by using a precharging pump. In turn, the concrete model calculation used to determine the desired braking pressure necessarily uses the estimated braking pressures and the admission pressure measured again by a sensor. This does in fact eliminate the use of additional sensors for pressure measurement; however, this method requires the use of the admission pressure as a measured value.

A method and a device to replace sensors for detecting a pressure quantity is described in German Patent Application 195 28 697 A1. In doing so, a differential pressure between a first pressure in a first line and a second pressure in a second line is determined in a braking system having an antilock braking system or a traction control system with a feed pump. A quantity serving as a measure of the speed of the feed pump is used as the starting point. A voltage electromagnetically induced by the overtravel of the feed pump is used for this purpose. Thus the dependence on the electromagnetically induced voltage is only present when the associated pressure medium is delivered via the pump; otherwise the pressure quantity is not determined or specified. In addition, the determined value is used as a measure of the rotational speed, the electromagnetically induced voltage, in particular. As a result, the rotational speed obtained from it is strongly dependent on voltage and temperature. These dependencies are not taken into account or compensated. Also, the influence of the production variation must not be ignored in the speed-forming quantity. In addition, with this method, pressure sensors can only be eliminated in the determination of a differential pressure between a first line and a second line. To determine an absolute pressure, it is again necessary for a pressure quantity to be detected as a reference by a sensor.

Thus it is evident that the known methods and devices named in the related art cannot provide optimum results in every respect.

OBJECTS AND ADVANTAGES OF THE INVENTION

The foregoing gives rise to the object to determine a pressure quantity in a braking system, an admission pressure and/or a wheel brake pressure, in particular, as an absolute value without the use of pressure sensors. In doing so, it is possible to use quantities which are already available in the particular control systems such as an antilock braking system (ABS), traction control system (TCR) an electronic stability program (ESP), a brake booster (HBV, HBU), a cruise control system (ACC), hill holder control (HHC) or hill descent control (HDC) without having to explicitly detect pressure quantities. Accordingly, the methods and the particular corresponding device for increasing the driving stability and/or safety in vehicles can be used for all systems or controls that influence the braking effect.

Using the methods according to the present invention in the device according to the invention, in particular, makes it possible to eliminate the use of pressure sensors. In particular, it is possible to eliminate the admission pressure sensor system used in the above-cited known methods. The values required, such as the starting value and the admission pressure value in estimating the wheel braking pressure or wheel pressure, can be determined using available signals such as wheel velocity, rotational speed or voltage or power consumption of the pump motor.

The idea of pressure estimation, the determination of the admission pressure, in particular, lies in the fact that the required torque of the pump motor in return delivery is directly proportional to the admission pressure. The disadvantage of pressure detection as a function of rotational speed is compensated by the use of power consumption as a measured value. This is possible since the power consumption of the pump motor is a function of the associated torque. Accordingly, the power consumption of the pump motor increases in linear proportion to the torque. That which, for example, the electromagnetically induced overtravel voltage, the current signal is continuously available for analysis and not only when the pump is in operation.

The voltage and/or temperature dependence of a value used as a measure of rotational speed can be eliminated or compensated by the use of currents, of at least one motor current, in particular. Also, the influence of manufacturing variance is then of less significance than in the rotational speed-forming value such as the electromagnetically induced motor voltage or overtravel voltage.

It is additionally advantageous to include a pressure-dependent factor in a relation between pressure reduction time and the volume of the pressure medium in question, in a pressure accumulator, in particular, for the pressure estimation since this takes into account the dependence of this relation or of this interrelationship on the pressure level and accordingly on the further increase of the quality and safety of the methods and device.

Advantageously, the influence of temperature on the precision of estimation of the particular, at least one, pressure quantity, of the admission pressure, in particular, is compensated according to the present invention in such a way that the temperature information, for example, is included in a proportionality factor for determining the pressure quantity or a corresponding mean value of proportionality factors and the latter are thereby varied and adapted.

A possible temperature dependence of the estimation, of the interrelationship between pressure reduction time and the volume cited in a preceding paragraph, in particular, is taken into account by applying a similarity or comparability of the temperature dependence of a current and a viscosity of the pressure medium and then including them in the method and device according to the invention. Moreover, an assumed and specified dependence of a current on the viscosity of the pressure medium advantageously even allows a temperature and estimation error to be compensated by one-time, constant, or continuous, variable inclusion of this current in the methods and particular device, for example, by forming a minimum in the current curve.

A further advantage is the fact that the methods of the invention and the particular corresponding device allow a plausibility check of the determined pressure variable or pressure variables to be performed, resulting in both a very high quality of the estimate or determination of the value and an increase of the reliability of the systems and controls influencing the braking effect by the resulting monitoring functions for the value.

These advantages apply as well to the case of $\mu$-split braking, i.e., an influencing of the braking effect in which at least one of the wheels is on a roadway surface having a coefficient of friction $\mu$ which differs from the others. This results in an additional increase in the reliability and calculability of the vehicle behavior.

An additional great advantage is the use of the methods and/or parts thereof already in the first control cycle in the systems and controls influencing the braking effect. As a result, the complete reliability of the system is present from the start. Specifying a higher coefficient of friction than the actual one increases the reliability even further.

DRAWING

Figure 2:
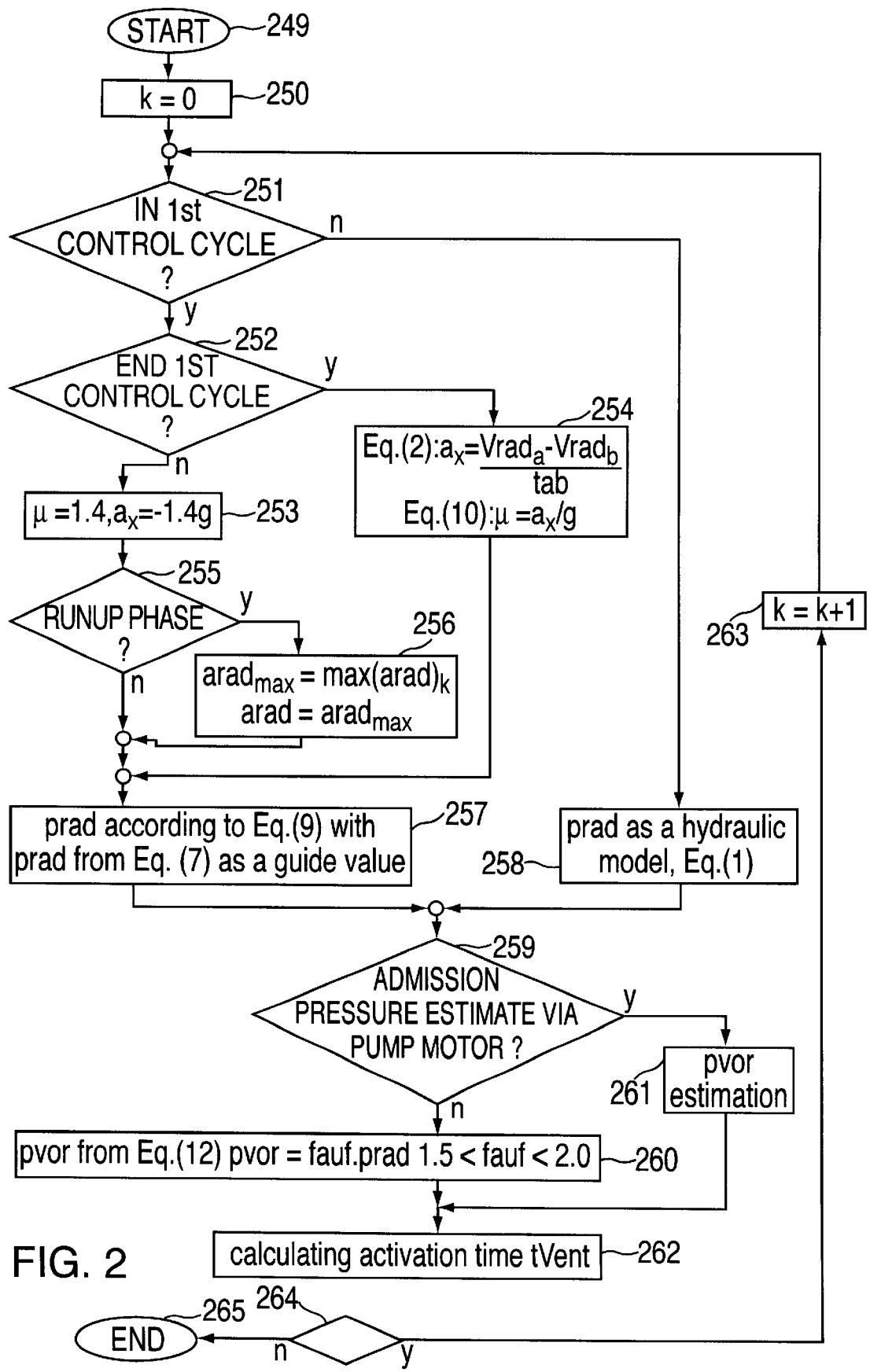
Figure 3:
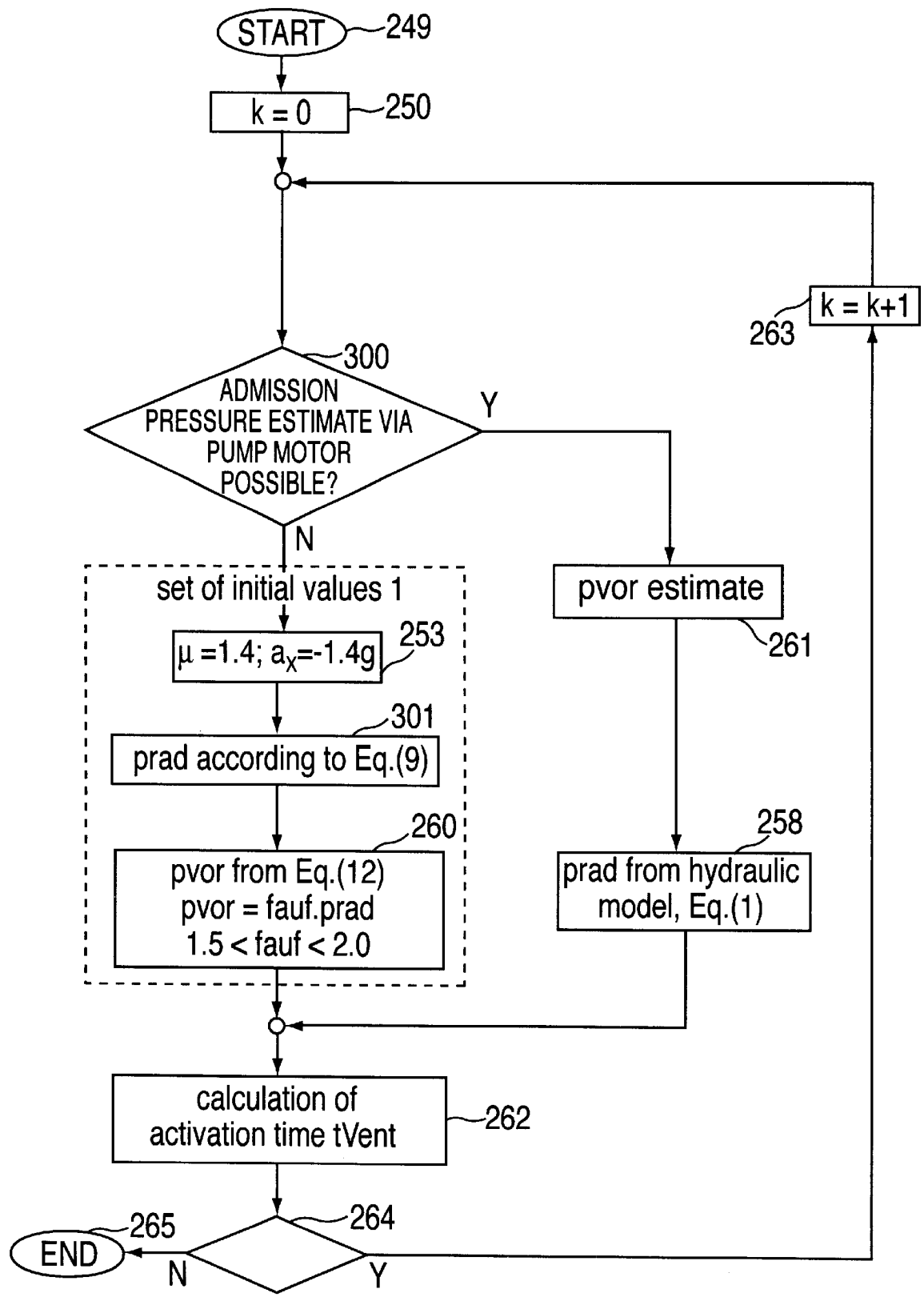
Figure 4:
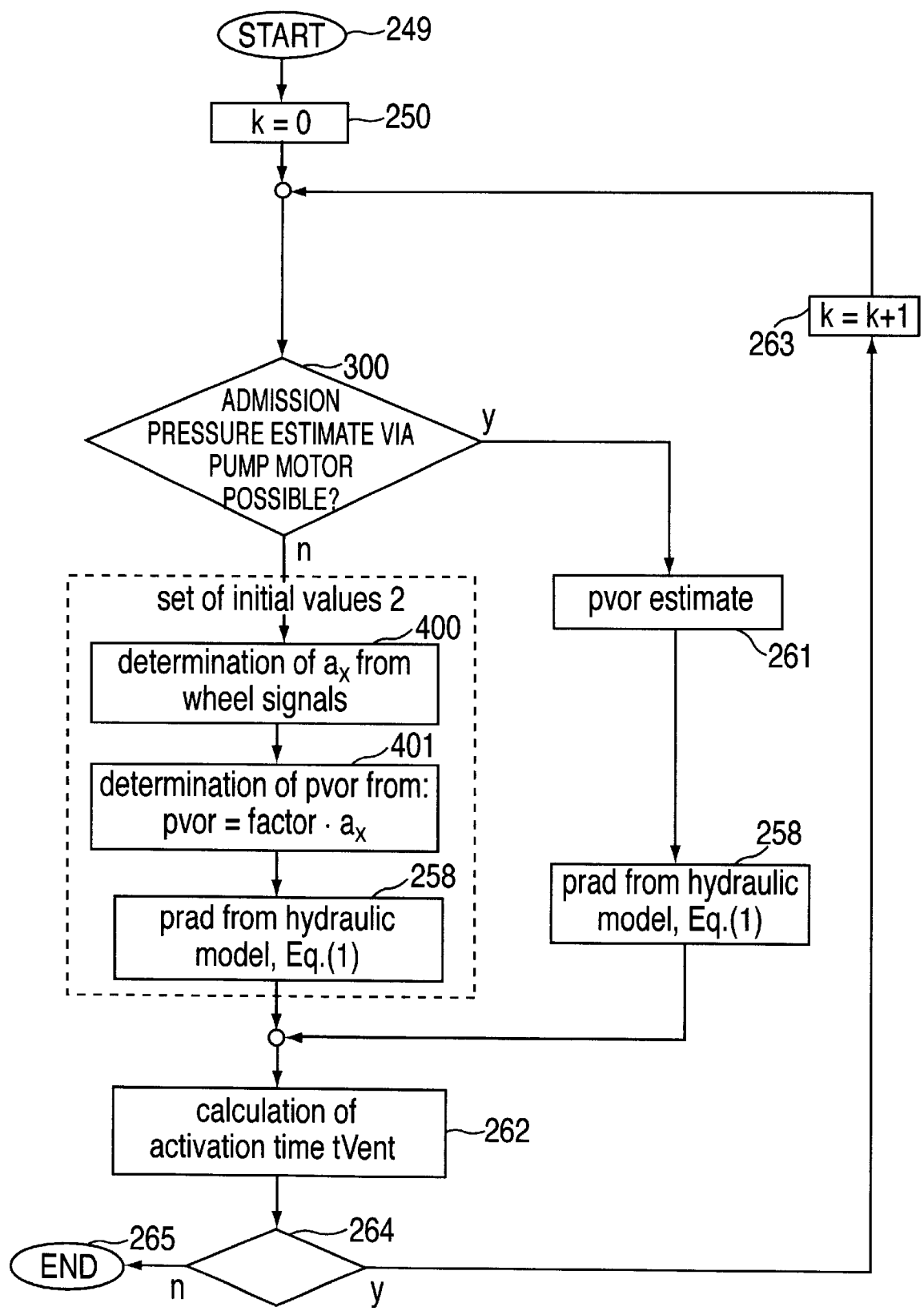
Figure 5:
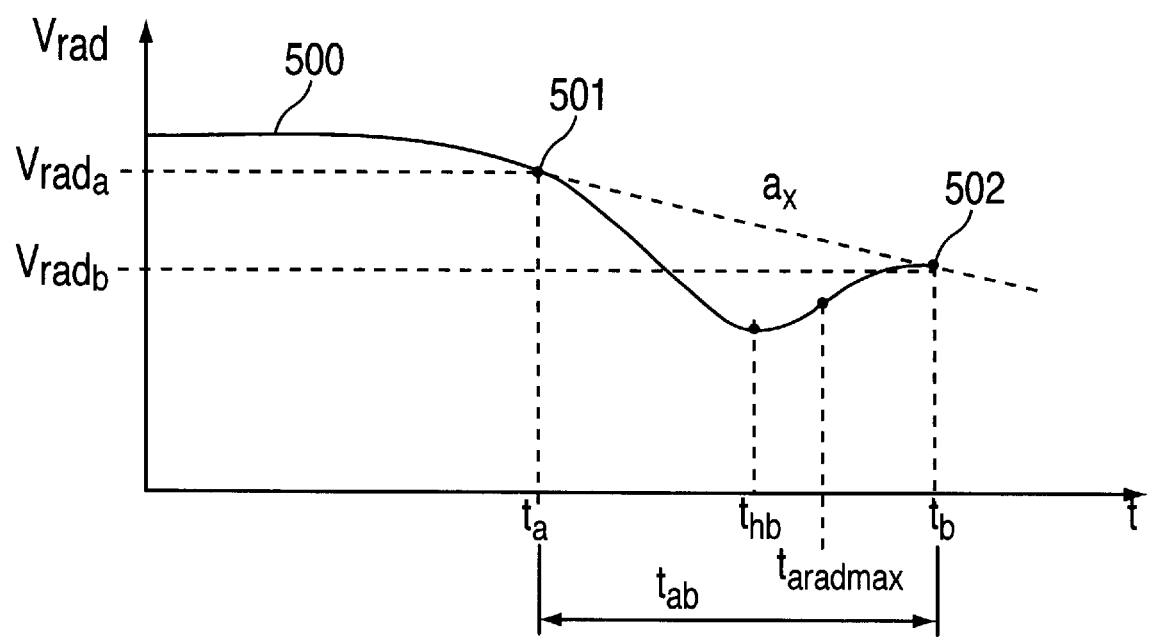
Figure 6:
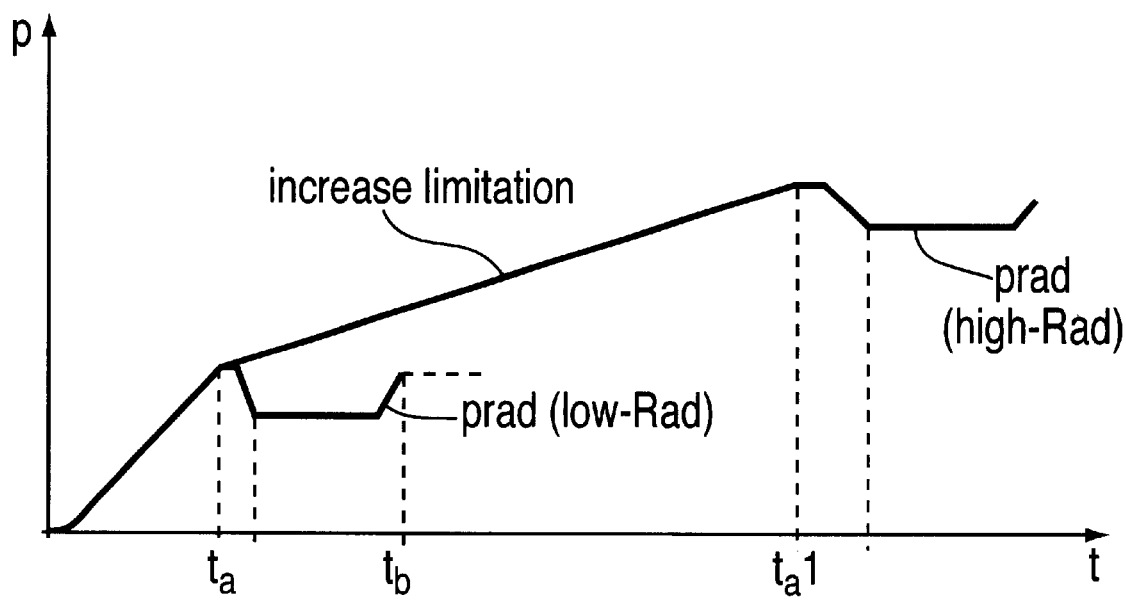
Figure 7:
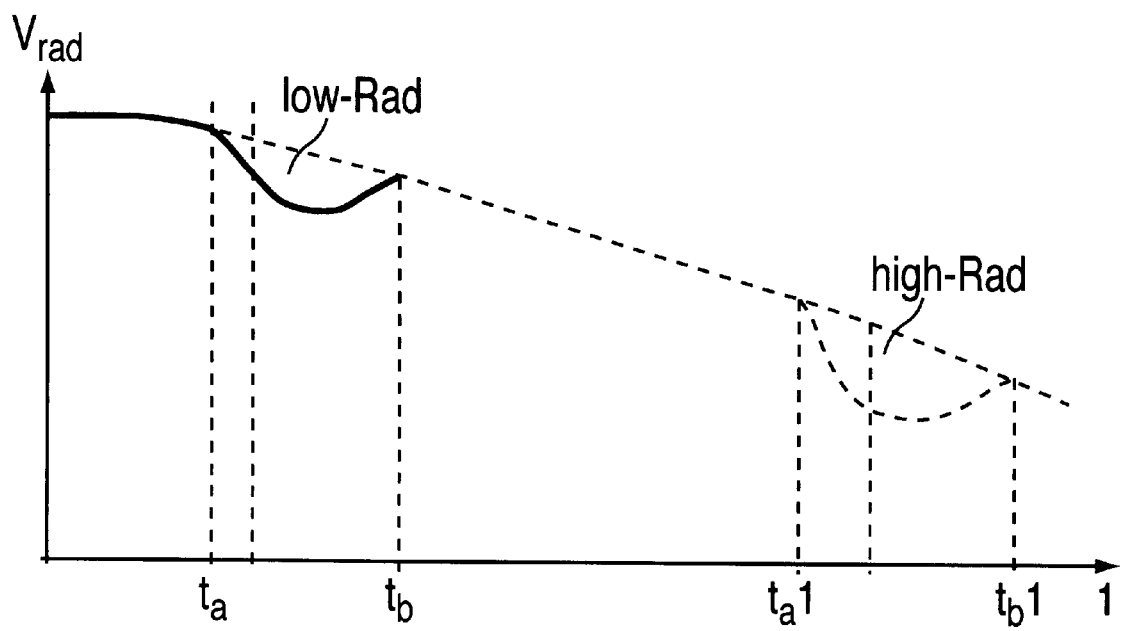
Figure 8:
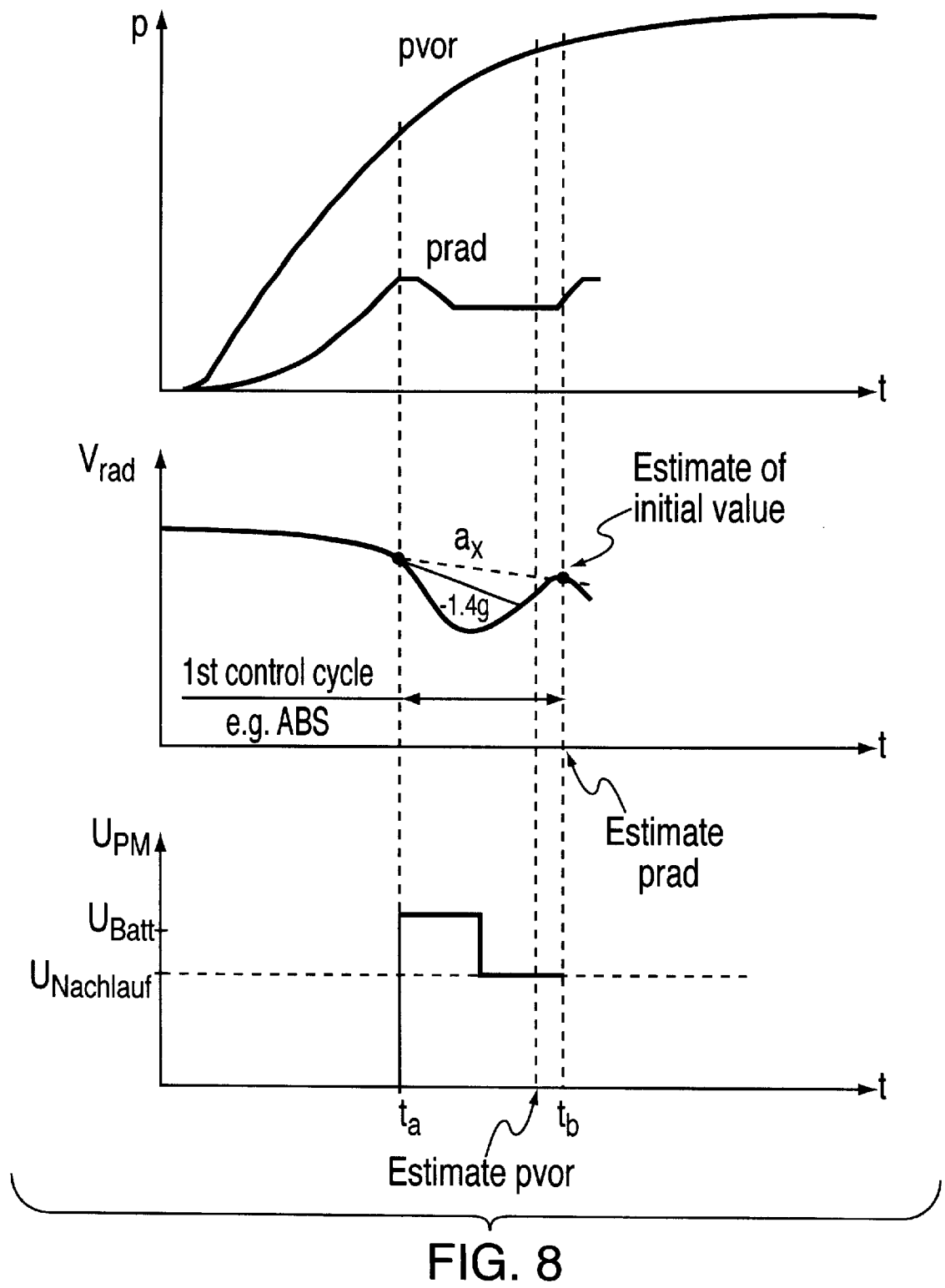

The present invention will be explained below with reference to the embodiments shown in the drawings. FIG. 1 shows as an example a braking system having wheel speed sensors and an associated control unit such as can be used for the aforementioned systems to influence the braking effect. FIG. 2 shows a first exemplary embodiment for pressure estimation, for wheel braking pressure and/or admission pressure estimation, in particular, in the form of a flowchart. An embodiment for pressure estimation which is simplified in relation to that of FIG. 2 is shown in FIG. 3, also in the form of a flow chart. FIG. 4 shows an additional embodiment for pressure estimation, again in a simplified form in relation to the example in FIG. 2. With reference to the shown embodiments, FIG. 5 shows an option of determining the vehicle deceleration in the first control cycle. In addition, FIG. 6 shows an option for determining the maximum wheel acceleration during the wheel runup. FIG. 7 shows the limitation of an increase in torque in the case $\mu$-split braking. FIG. 8 provides a schematic representation of the estimation sequence in timing diagrams.

Figure 9:
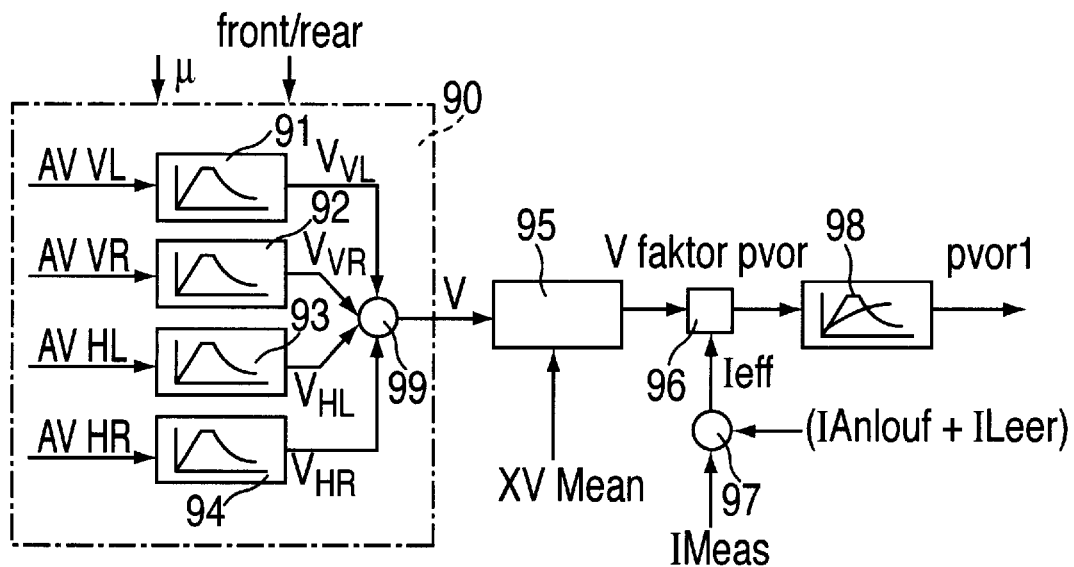
Figure 10:
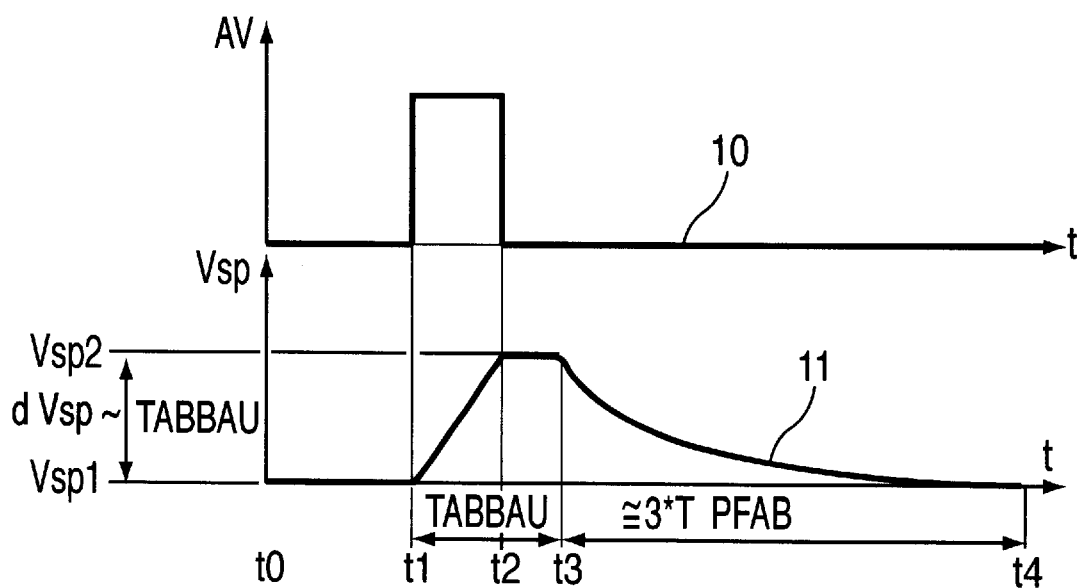
Figure 11:
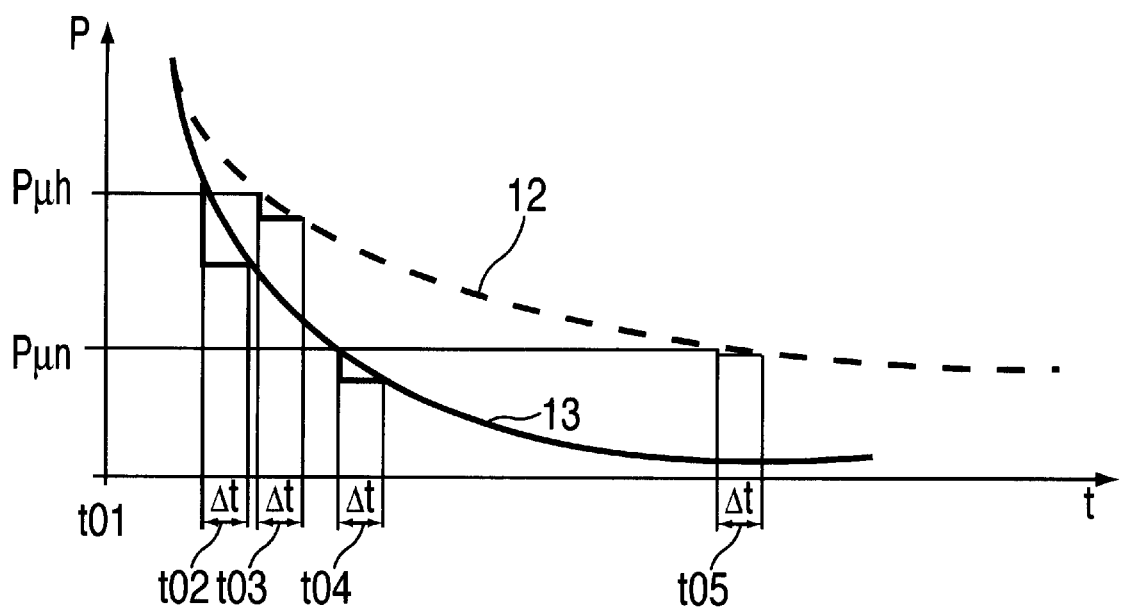
Figure 12:
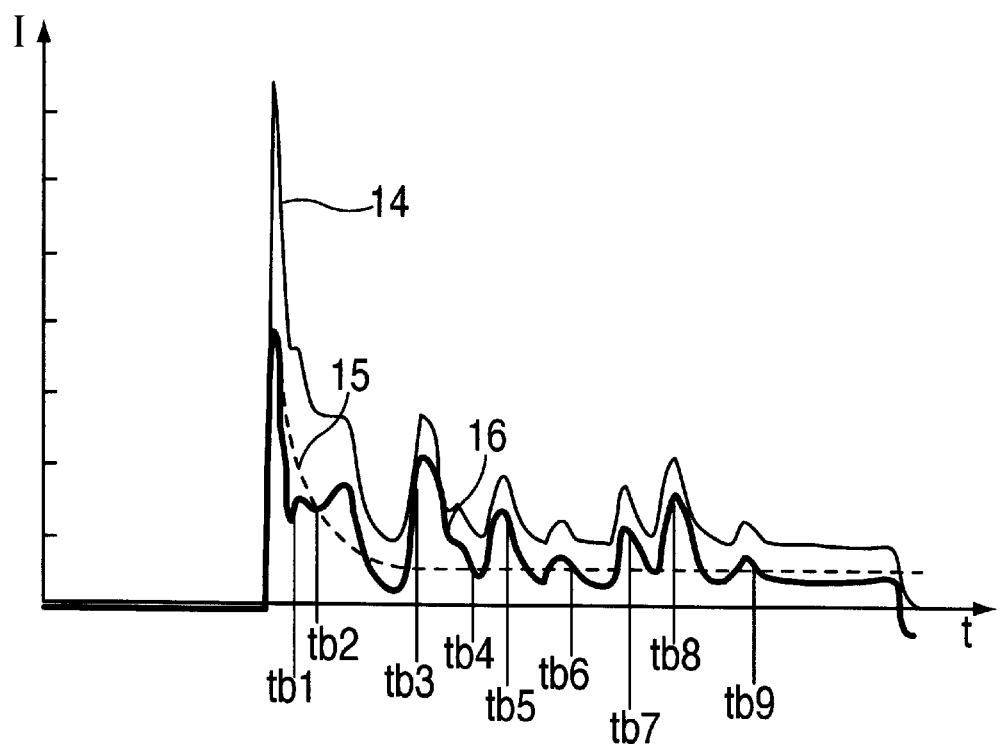
Figure 13:
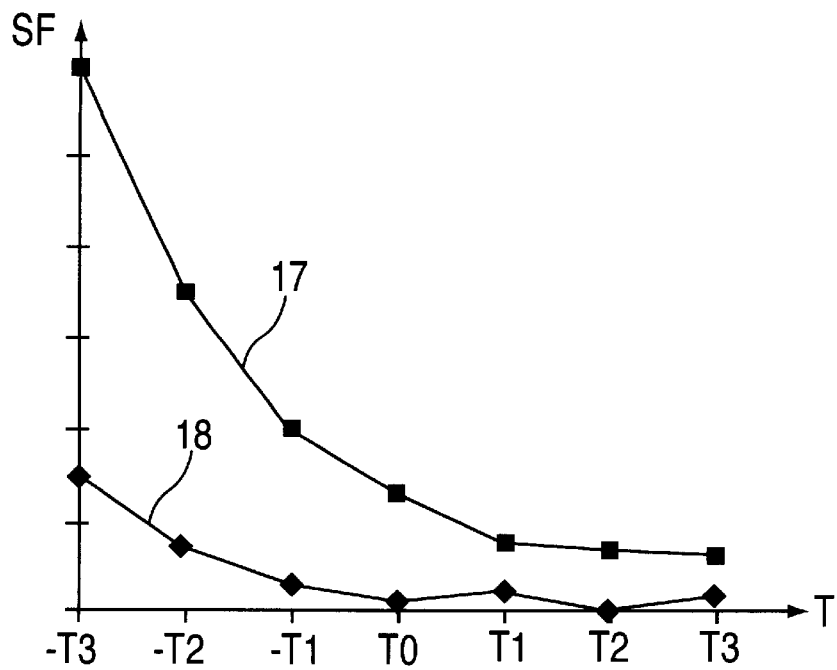
Figure 14:
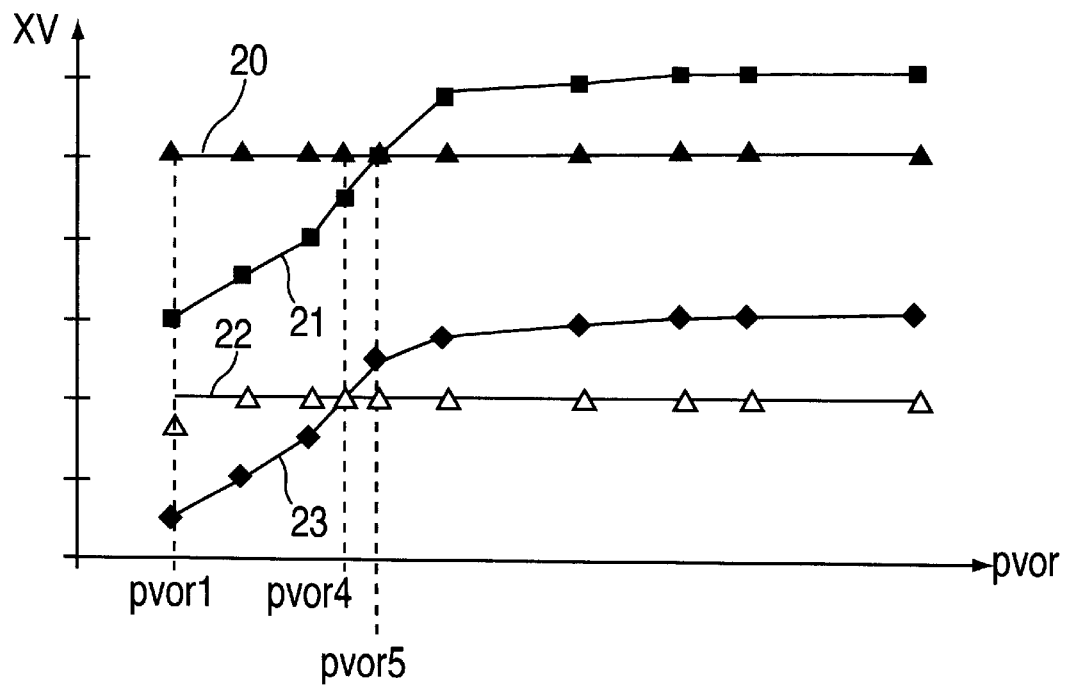
Figure 15:
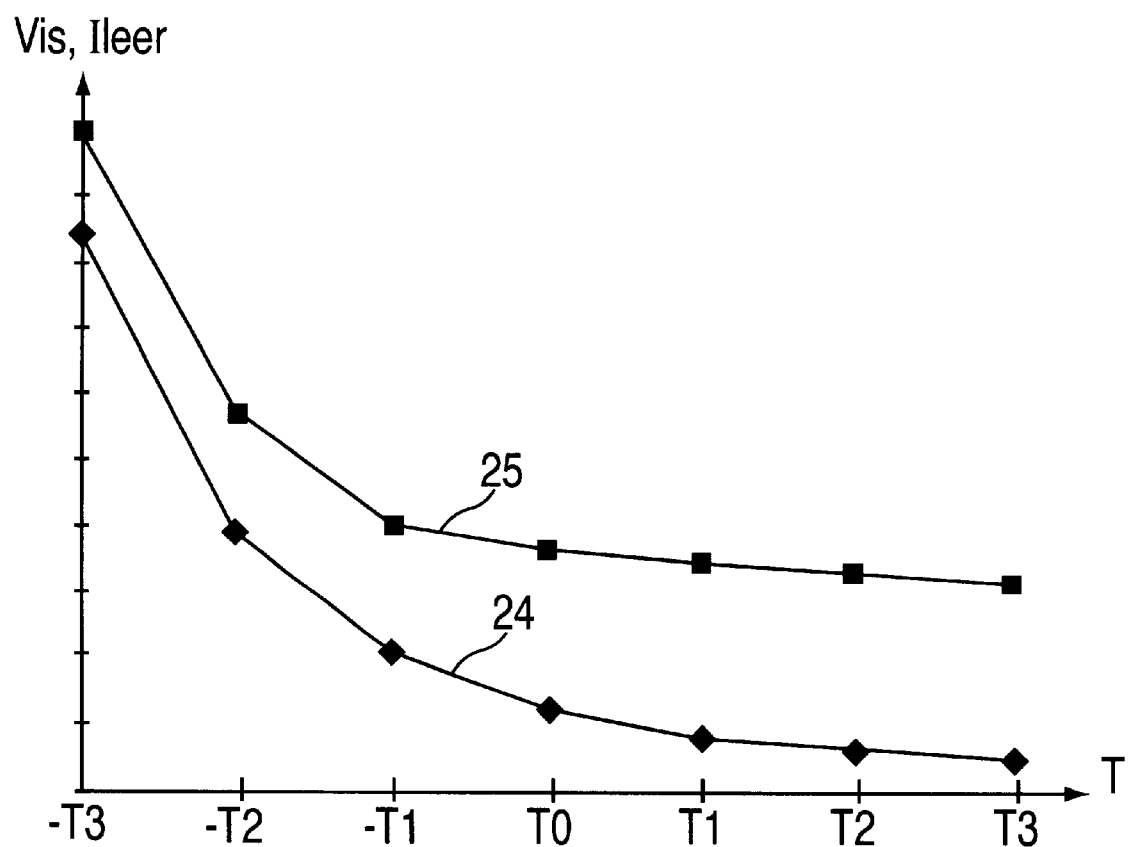

FIG. 9 provides a general representation of a concrete example for pressure estimation, admission pressure estimation, in particular. In addition, FIG. 10 shows a schematic representation of a volume model. FIG. 11 represents a brake circuit dependence and pressure dependence of the volume of the pressure medium, among other things in an accumulator, in particular. A possibility for determining the effective current component that can be used in the embodiments is shown in FIG. 12. A temperature dependence of the pressure estimate, the admission pressure estimate, in particular, is shown in FIG. 13. FIG. 14 shows the proportionality factor used for admission pressure estimation, in particular, as a function of a pressure quantity and temperature. Finally, FIG. 15 shows a comparison of the viscosity of the pressure medium with the current consumption of the device for delivering the pressure medium, the pump motor, in particular.

DESCRIPTION OF THE EXEMPLARY EMBODIMENTS

The exemplary embodiments are described with reference to the hydraulic vehicle braking system shown in FIG. 1 having a control unit 240 and wheel speed sensors 245 to 248. This braking system is selected here as an example. The invention, however, can be used in a large number of systems influencing the braking effect and corresponding braking systems. The functionalities in relation to the systems influencing braking effect, ABS, TCS, FDR, in particular, can either be integrated in control unit 240 or embedded in an additional control unit or higher-level logic, the latter then being in communication with control unit 240.

Brake pedal 100 is connected to brake master cylinder 103 by a piston rod, for example, via a brake booster 101. A brake fluid reservoir 102 is connected to brake master cylinder 103 which has a dual circuit in this case. A charging pump 104 is connected between them via a line for the pressure medium. The charging line of charging pump 104 opens into a master brake line which originates from a connector of the brake master cylinder and leads into hydraulic unit 106 for a first brake circuit. An additional master brake line for a second brake circuit also leads to hydraulic unit 106 from an additional connector of brake master cylinder 103. Since charging pump 104 is connected to only one brake circuit via its charging line, a modified central valve is provided for brake master cylinder 103, via which the second brake circuit can also be provided with the pressure medium delivered by charging pump 104. A dividing piston located between the brake circuits in the brake master cylinder causes the charging pressure built up by the pressure medium and the charging pump to produce an effect in the second brake circuit as well. However, a charging pump may also be provided for each brake circuit, as a result of which no change in the central valve is provided for the charging pump to penetrate the other brake circuit. Hydraulic unit 106 is connected to wheel brakes 107 to 110 via lines to conduct the pressure medium. No indication of the position of the particular wheel brakes is given intentionally since no specific arrangement is necessary for the methods and device according to the invention. Instead, all conventional brake circuit distributions, parallel or diagonally split as well as individual wheel braking, etc. can be used. The control associated with the device is schematically represented as block 240. Among other things, both the individual valves in hydraulic unit 106 as well as the motors of the individual pumps used in the braking system are connected to this control unit 240. The charging pump and its motor are activated by control unit 240 via one of the control lines of line bundle 241. A motor of at least one return pump is also operated via a control line of line bundle 241. Similarly, the valves of the brake circuits can be operated with the aid of line bundle 241. Also, the other necessary control lines and connections which are known to the person skilled in the art, which, for example, are used to activate the inlet and outlet valves of the individual wheel brakes are combined in line bundle 241 and are not explicitly mentioned. Line bundles 241 and 242 are shown as an example with three connectors each, once for the input side (242) and once for the output side (241) of control unit 240. However, the exact number of lines and connectors depends on the particular design of the braking system. Thus in the case of a separate higher-level logic for the systems influencing the braking effect such as ABS and/or TCS and/or ESP, control unit 240 can receive input quantities from it via line bundle 242 and deliver output quantities to it via line bundle 241. For simplification of the description, any switching devices for activating the pump, for example, for isolating the pump motor from or connecting the pump motor to the supply voltage or the other actuators, are also integrated in the block of control unit 240 and are not explicitly developed.

Block 104 for the charging pump contains a pump 200, the associated pump motor 201 and a relief valve 216. To provide greater clarity in the presentation, all relief valves are shown in FIG. 1 in the form of a non-return valve 216. However, this is not absolutely required according to the present invention and thus various valves or valve combinations can be used in connection with this safety function depending on the particular system. Hydraulic unit 106 is shown separated into two brake circuits 220 and 230. Only one brake circuit 220 will be described in detail below. The analogous elements in the not explicitly described brake circuit 230 are provided with identical numbers and the added letter 'a'. Similar to relief valves 216, filters 215 used in the drawing are not identified individually but rather are combined in 215. The arrangement of the filters used here is also not compulsory. The filters can be used as desired consistent with the requirements.

In brake circuit 220 to be described, an accumulator chamber 207 is attached to the master brake line. Pressure medium is introduced into the brake circuit via a precharging valve 204 These controllable directional control valves 204 and 204A are designed, for example, as electromagnetically controllable 2/2 directional control valves and are mounted between brake master cylinder 103 and return pump 203. Damper chamber 208 is connected to the output side of return pump 203. Throttle 213 follows in the direction of brake master cylinder 103 and in the direction of the respective braking pressure buildup valves, i.e., inlet valves 209, 209A into the wheel brakes. The discharge of the pressure medium from the brake circuit is controlled via a combination of reversing valve and pressure limiting valve 205. This reversing valve 205 can be bypassed via a non-return valve so that when automatic braking is switched on, sufficient pressure on brake pedal 100 makes it possible for pressure to propagate from brake master cylinder 103 to the valve arrangements for braking pressure modulation 209 to 212. Of these brake valve arrangements, the inlet valves of the individual wheel brake cylinders are identified as 209 and 210 and the outlet valves as 211 and 212. In addition, a pressure accumulator 206 is mounted to the pressure line leading from outlet valves 211 and 212 to return pump 203. Return pump 203 itself is driven by a motor 202.

Wheel speed sensors for the individual vehicle wheels are identified as 245 to 248. They are connected to control unit 240. The named actuators as well as the individual pump motors 202 and 201 and the named valves and valve arrangements are activated in this case by control 240.

The method shown in FIG. 2 for pressure estimation and the activation time of the actuators shown in FIG. 1 can be executed in the form of a program in control unit 240 of FIG. 1. The sequence is started in block 249. This start may also take place simultaneously with the start of a control process influencing the braking effect such as ABS, TCS, ESP or together with such a controller intervention, or the start sequence may, for example, also be executed by switching on the ignition, the possibility existing in both cases that the described process permanently runs in the background and thus continuously supplies pressure estimation values. In block 250, a counting variable k for the various cycles is set to a specific value, 0 for example. In query 251, a check is made if the particular control system such as ABS, TCS, ESP is in the first control cycle. If this is not the case, the sequence continues in block 258 in which the wheel pressure or wheel braking pressure prad can be determined from a hydraulic model, for example. The principle of wheel pressure estimation based on a hydraulic model is the calculation of the wheel brake pressure according to the following equations:

$$prad(k+1) = prad(k) + pVkenn \cdot \sqrt{pdiff(k)} \cdot tVent(k) \qquad \text{equa. (1)}$$

$$pVkenn = f(prad(k))$$

$$pdiff_k = \begin{cases} prad(k) & tVent(k) < 0 \\ & \text{if} \\ pvor(k) - prad(k) & tVent(k) > 0 \end{cases}$$

the following being true for tVent:
tVent<0: pressure reduction,
tVent>0: pressure buildup,
tVent=0: pressure holding.

Assuming a starting value prad(0), for k=0, the present wheel pressure or wheel braking pressure prad (k+1) can be continuously extrapolated using admission pressure pvor(k), wheel pressure(k) and valve activation time tVent(k) of the past, it being possible to determine starting value prad(0) from admission pressure pvor. If the control is not in the first control cycle, the necessary starting value prad(0) and the other necessary values are available in block 258. If, however, it is determined in query 251 that the sequence is in the first control cycle, the process continues with query 252. In the first control cycle, if admission pressure pvor and thus the starting value of the wheel pressure or wheel brake pressure prad(0) are still not present, the hydraulic model cannot be used without additional measures. In the known methods, the use of an admission pressure sensor makes it possible to use a hydraulic model because the starting value of wheel pressure prad(0) can be derived from the measured admission pressure pvor. In the first control cycle, when pump motor 202 is still not delivering, it is however not possible to estimate the admission pressure with pump motor 202. For this reason, starting value prad(0) of the integration equation of hydraulic model equa. (1) cannot be determined from admission pressure pvor.

If it is determined in query 251 that it is still the first control cycle, the sequence continues with query 252. In this query, it is now determined if the end of the first control cycle has been reached or will be reached within a specifiable time or number of sampling times. If this is the case, the values necessary for further calculation are available in block 254. Thus the vehicle deceleration or negatie vehicle acceleration ax can be determined in block 254 using $$ax = \frac{(vradb - vrada)}{tab} \qquad \text{equa. (2)}$$

This will be explained in greater detail below with reference to FIG. 5. From the determined vehicle deceleration ax, it is now also possible to calculate the coefficient of friction $\mu$, which will also be used for further calculation, according to the following equation:

$$\mu = -\frac{ax}{g} \qquad \text{equa. (10)}$$

If however it is determined in query 252 that the end of the first control cycle has still not been reached, the sequence continues in block 253. Here the still unknown values, vehicle deceleration ax and coefficient of friction $\mu$ are specified. The specifiable coefficient of friction $\mu$ in block 253 is assumed to be greater for the sake of safety. For example, when used in an ABS control, the friction value is assumed to be $\mu>1$, for example 1.4, to favor safe ABS braking. Using the aforementioned equation equa. (10), it is possible to determine the vehicle deceleration or negative vehicle acceleration ax from the specifiable coefficient of friction $\mu$. The sequence continues with query 255 in which it is asked if a runup phase is present or not. In this connection, a runup phase means the wheel runup after a control intervention, in particular. For example, in the case of ABS this means that the wheel speed increases again after it was reduced by the braking intervention due to a detected tendency of the wheel to block and the pressure reduction resulting from it. This speed increase which, for example, is individual for each wheel in the case of ESP can, for example, be detected via wheel speed sensors 245 to 248. If the runup phase is detected, the sequence continues in block 256. In it, during the runup phase within the first control cycle, the current maximum wheel acceleration aradmax is also determined instead of wheel acceleration arad and is used for the further calculation. Aradmax is determined, for example by comparing the acceleration value at each sampling time with the preceding wheel acceleration value arad. For the further calculation, wheel acceleration arad is in this case equated with maximum wheel acceleration aradmax. At the end of the first control cycle, the previously assumed value of vehicle deceleration ax is corrected by equation 2 in block 254. From this, it is possible to update coefficient of friction $\mu$ according to equation 10 in block 254 as well.

If there is no wheel runup phase according to query 255, a jump is made directly to block 257. In this case, either a value for wheel acceleration arad may be specified or the actual value determined, for example, via the wheel speed sensors may be used. It is also possible to move to block 257 from block 256 and block 254. In this embodiment, this means that in the first control cycle (251), the wheel braking pressure or wheel pressure prad cannot be calculated from a hydraulic model as, for example, according to equation Equa. (1) and it therefore must be determined in another manner in block 257. A rough wheel pressure estimate from vehicle deceleration ax is possible in the following equation:

$$prad = \frac{rrad \cdot (-mF \cdot ax + Fkorr)}{2 \cdot (cpv + kab \cdot cph)} \qquad \text{equa. (7)}$$

The rough value for wheel pressure or wheel braking pressure prad thus obtained is the mean wheel pressure in the first control cycle and essentially serves as a guide value for the wheel pressure estimate of individual wheels which are determined with the next set of initial values.

$$prad = \frac{0.5 \cdot \mu \cdot mF \cdot (g \cdot L \mp ax \cdot \kappa) \cdot rrad - \dfrac{Jrad \cdot arad}{rrad}}{cp} \qquad \text{equa. (9)}$$

The aforementioned equation equa.(9) makes it possible to estimate wheel pressure prad more accurately than with equation equa. (7). In doing so, a distinction is made, for example, between the front and rear wheels. Accordingly, cp in equation equa. (9), the braking torque coefficient, is different for the front and rear wheel if, for example, a pressure reducer is used on the rear wheel. Thus the braking torque coefficient is unchanged at the front wheel and is identified there as cpv (=cp). For the rear wheel, however, the use of a pressure reducer, for example, causes an attenuation factor kab for the rear wheel to be applied to the braking torque coefficient cp which is thus kab*cph, cph corresponding to the braking torque coefficient of the rear wheel; it may also be identical to cpv. Likewise, the value L, in which rear wheel axle load $\Psi$ is included, is different for the front and rear wheels. For the rear wheel, value L corresponds to rear axle load $\Psi$; however, for the front wheel, 1-$\Psi$ must be used for L. In addition, the "−" sign before ax stands for front wheels and the "+" sign before ax stands for rear wheels. This wheel braking pressure or wheel pressure prad calculated with equation Equa. (9) and with equation equa. (7) then serves as starting value prad(0) for k=0 for the wheel pressure estimate with the aid of the hydraulic model according to equation equa. (1).

Query 259 follows both block 257 and block 258. There, it is asked if an admission pressure estimate via pump motor 202 and/or 201 is present or has already been made. A simple way for this to occur, for example is to determine if an admission pressure value pvor is present or not. An additional possibility is to ask in query 259 if the input variables necessary for the admission pressure estimate (see equations for admission pressure estimate starting with FIG. 9) in block 261 are available or not. If this is the case, it is thus determined in query 259 that an admission pressure estimate via pump motor 202 and/or 201 is present, the sequence continues with block 261, the actual estimate of admission pressure. This admission pressure estimate according to block 261 will be described in detail later with reference to FIGS. 9 to 15. However, two simple options should be described briefly already in advance.

Admission pressure estimate is based on the fact that the required torque of pump motor 202 and/or 201 is directly proportional to the admission pressure during return flow. Since the torque is a function of the power consumption or of the rotational speed, the admission pressure estimate is based on measuring one of these values. One possibility for doing this is to measure the rotational speed of the pump motor by measuring the induced motor voltage Unachlauf after a defined activation time. Instead of rotational speed, the reduction of rotational speed of the pump motor over time may also be measured. This takes place by measuring the induced motor voltage Unachlauf twice within a time window after a defined activation time. In this case, however, the dependence is only present if the pump is delivering. Thus the dependence is strongly dependent on voltage and temperature, and the influence of manufacturing tolerances must also not be ignored.

Measuring the power consumption of pump motor 202 and/or 201 offers a better option. The power consumption of pump motor 202 and/or 201 increases in linear proportion to the torque. The power consumption can be measured, for example by a measuring shunt; the voltage drop can be measured using a switching transistor or across a supply lead.

The admission pressure estimate using pump motor 202 and/or 201 does not occur, however, until during the first control cycle. As long as the admission pressure estimate is not present, admission pressure pvor must be determined in a different manner. The following equation, for example, may serve this purpose:

$$pvor = fauf \, prad \qquad \text{equa. (12)}$$

for example, with 1.5<fauf<2.0.

In this way, the admission pressure is calculated from the wheel braking pressure. The quantity fauf represents the ratio pvor/prad, i.e., admission pressure pvor to wheel braking pressure prad and may be selected, empirically or preferably from laboratory values, between 1.5 and 2.0. The definition of admission pressure pvor given in 260 may be necessary if valve activation time tVent is determined as in the known methods, for example, using an inverse hydraulic model from admission pressure pvor, wheel braking pressure prad, setpoint wheel braking pressure pradsoll and volume characteristic pvkenn. In this connection, pradsoll is the setpoint for wheel pressure determined by the particular controller or system (ABS, TCS, ESP, etc.). Similarly, activation time tVent could be taken from a characteristic diagram. Admission pressure pvor now determined in block 260 or block 261 is now used in block 262 to determine activation time tVent of the valves, inlet and/or outlet valves 209 to 212, in particular. Similarly, the determined admission pressure pvor can be used to determine the activation time for additional actuators in the braking system such as the device for delivering the pressure medium, return pump 203, charging pump 200 or reversing valves 205 and charging valves 204, in particular.

In query 264, it is then asked if an additional cycle should be executed or not. If this is not the case, the sequence continues in block 265, the end of the process. Otherwise, run variable k, i.e., the counter, is increased by 1 in block 263. Should this process only be carried out in the case of a control intervention by ABS, TCS, ESP, for example, a check is made in block 264 if such a control intervention is present. If the process is to be operated continuously in the background in the second case, the decision criterion in query 264 is, for example, switching the ignition on and off. From block 263, a move is made back to query 251 whether the first control cycle is present or not. As of the second control cycle, the wheel pressure or wheel pressure braking estimate is then completed using the hydraulic model according to equation equa. (1). This can actually be started if the starting value of wheel pressure or wheel braking pressure prad has been established. This means that the estimate using the pump motor is already present before the second control cycle. The wheel pressure estimate and the admission pressure estimate are continuously used for the control. This also means that the run variable or counter k need not be synonymous with the number of control cycles; however, it may be.

FIG. 3 shows an additional embodiment which was developed from the method described in FIG. 2. A set of initial values 1 is used for the alternative pressure estimate. The start sequence of block 249 takes place according to the same prerequisites as in the embodiment of FIG. 2. Similarly, the run variable or counter k is set to 0 in block 250. This time, however, block 250 is followed by query 300 in which it is now asked if an admission pressure estimate is possible using the pump motor. This may take place similar to query 259 in FIG. 2 by asking if the values necessary for the admission pressure estimate according to block 261 are present or can be determined. If this is the case, the sequence continues with block 261 in which the admission pressure estimate is made as in FIG. 2. Starting from this admission pressure value pvor, the wheel pressure or wheel braking pressure prad is determined in block 258 from the hydraulic model according to equation equa. (1). If the values necessary according to block 261 are not present, if it is not possible, for example, to estimate the admission pressure using pump motor 202 and/or 201 according to query 300, the sequence continues with block 253 in which a coefficient of friction $\mu$ is specified taking safety considerations into account. From this specification, it is in turn possible to estimate a vehicle deceleration ax according to equation equa. (10). With these specifications, wheel pressure prad is determined in block 301 from the aforementioned equation equa. (9). A guide value for wheel pressure prad according to equation equa. (7) is not determined in block 301. However, it would be conceivable to use block 257 from FIG. 2 here which would then replace block 301. In this embodiment, immediately after determining wheel braking pressure prad from equation equa. (9), admission pressure pvor according to block 260 is determined from equation equa. (12). According to initial values 1, wheel braking pressure prad from block 301 and admission pressure pvor from block 260 are thus present. In the other case of this embodiment, both values from block 261 (pvor) and block 258 (prad) are present. With the values thus determined, it is in turn possible in block 262, as in the preceding embodiment, to calculate activation time tVent for actuators present in the braking system, the valves, in particular. It is again asked in block 264 if additional cycles are to be executed. If this is not the case, a move is again made to the program end (265). Otherwise, the counter or the run variable k in block 263 is again increased by 1 and the sequence continues with the query in block 300.

An additional variant results from the embodiment in FIG. 4. It is comparable to the variant in FIG. 3 with the exception of initial values 1 which is here replaced by initial values 2. The descriptions of the blocks identified identically can be found in FIGS. 2 and 3. If an admission pressure estimate using pump motor 202 and/or 201 according to query 300 is not possible in FIG. 4, the vehicle deceleration ax is determined from wheel signals according to block 400. This can be done, for example by analyzing the sensor data of wheel speed sensors 245 to 248. A vehicle deceleration ax thus determined according to block 400 may of course also be used in the previous embodiments according to FIGS. 2 and 3. In this case, admission pressure pvor is now determined in block 401 according to the following equation:

$$pvor = factor \cdot ax \qquad \text{equa. (15)}$$

This equation is based on the idea that admission pressure pvor to be determined and vehicle deceleration ax are correlated, are proportional, in particular, and can be linked via a factor "factor". This factor can, for example, be determined from measured values and/or from a characteristic diagram. Thus, the proportionality factor "factor" can also be specified in advance in a learning phase, for example, as the mean of all or of most of the control situations occurring in the system influencing the braking effect (ABS, TCR, ESP, etc.). Admission pressure pvor thus determined in block 401 is now used in block 258 to determine wheel pressure prad from the hydraulic model according to equation equa. (1). The rest of the sequence corresponds to the one already described in FIG. 2 or FIG. 3.

FIG. 5 shows how vehicle deceleration ax is determined according to equation equa. (2) with reference to a description of wheel speed vrad over time. Curve 500 shows the variation of the wheel speed under the influence of a control intervention such as, for example, ABS, TCS, ESP. Until time ta, for example, the pressure buildup takes place, whereupon the wheel speed is decreased. In the transition to the pressure holding phase at point 501, wheel speed vrada occurring at that time is determined and stored by converting the values from wheel speed sensors 245 to 248, for example. After the pressure reduction when wheel ab thb is in run up in a further pressure holding phase, wheel acceleration arad, maximum wheel acceleration aradmax, in particular, is then determined and stored in the form of the greatest slope of curve 500 starting at thb. The start of the wheel runup is, as mentioned earlier, at time thb at the end of the pressure reduction phase and at the start of the pressure holding phase. Until time tb, maximum wheel acceleration aradmax is thus determined, wheel acceleration aradmax being located, for example, at taradmax. At the end of the runup phase at the start of the next pressure buildup phase 502 at time tb, the present wheel speed vradb is determined and stored. Vehicle deceleration ax can then be determined from the difference of the two wheel speeds in relation to Δtab of the difference of times ta, tb of their occurrence. The time of the determination of the wheel pressure after the first control cycle can thus be tb. In this connection, it is important that there be no slip and no blocking on the measured wheel since otherwise incorrect values would arise. This can be achieved by determining vehicle deceleration ax from wheel speeds vrad which are averaged from all the wheels.

A further method to prevent incorrect values and to increase the quality of the estimate is a plausibility check. Immediately after calculation of vehicle deceleration ax using equation equa. (2) and $\mu$ having been established accordingly using equation equa. (1), wheel pressure prad is calculated using equation equa. (7) and equation equa. (9). The calculation is made wheel by wheel. Vehicle decelerations ax of all wheels can be checked for plausibility. Vehicle deceleration ax is a vehicle value and must therefore be equal for all wheels. With a homogeneous roadway, the calculation using equation equa. (9) should also provide identical values for all wheels. The basis of the plausibility check are the equations for homogeneous roadways, for example, with regard to the wheel pressure of the front wheels pradv and of the rear wheels pradh depending on the brake circuit distribution. The wheel pressure at the front wheel pradv corresponds to wheel pressure prad; at the rear wheel, attenuation factor kab again appears as a factor (pradh=kab*prad) if a pressure reducer is present. By using these relations and wheel-specific values (also including ax) in equation equa. (7) and equation equa. (9), a total of eight values for prad are obtained which can be equalized, for example, by averaging and/or can be compared directly. As long as ax is not determined by slope calculation according to equation equa. (2), of course only one value is available from equation equa. (7). In this case only five values are available for averaging and/or for comparison. Deviation in individual wheels can be determined and analyzed by the plausibility test, on the basis of the eight or five values.

The special case of $\mu$-split braking with different friction values $\mu$ caused, for example, by varying roadway surfaces or characteristics is shown in FIGS. 6 and 7. In the case of $\mu$-split braking, different friction values $\mu$ occur laterally, at the wheels, for example. To attenuate the yawing moment caused by $\mu$-split, the increase in torque must be limited on the high side; this means that the increase in torque on the side, i.e., at the wheels located on the part of the roadway with greater adhesion, i.e, with the higher coefficient of friction $\mu$, i.e., the high wheels. For this purpose, the wheel speed for a low wheel (smoother part of the roadway, lower $\mu$) and a high wheel are plotted over time in FIG. 7. In addition, FIG. 7 shows the pressure curve for a high wheel and a low wheel over time correlated with the vehicle speeds from FIG. 7. Since an average $\mu$ is calculated from the vehicle decelerations ax in the case of $\mu$-split braking, the calculation according to equation equa. (7) and equation equa. (9) generally provides excessively high values for a low wheel and excessively low values for a high wheel with ABS, for example. The increase limitation on the high side, however, causes the error to be small in comparison to a case without limitation. In a case of $\mu$-split braking, the low wheels are controlled first, for example, by ABS control. The wheel pressure is automatically estimated only for low wheels until the high wheels are also controlled, for example in ABS control. There are then four or three values available for averaging wheel pressure prad for the low wheels. A $\mu$-split recognition is thus not necessary. Since the increase limitation is specified by the vehicle control unit and is known, the wheel pressure of the high wheels can be calculated directly from the results of the low wheels, taking the increase limitation into account.

FIG. 8 shows once more a schematic representation of the sequence of the estimation with reference to three diagrams. Pressure p is plotted once over time t. Within it, the curve of admission pressure pvor and a wheel pressure prad are plotted qualitatively. At time ta, the transition of wheel braking pressure prad from pressure buildup to pressure holding can be clearly recognized in pressure diagram p(t). The representation of motor voltage UPM of the pump motor was selected to make the use of the pump clear. The times of pressure estimation pvor and prad have been made recognizable. The estimate of starting value prad(0) for the hydraulic model according to equation equa. (1) is also shown. The time span for a control cycle such as in an ABS control is described here between ta and tb. The assumed delay in relation to real vehicle delay ax is represented on the straight line segment identified as −1.4 g, and the figure shows that the coefficient of friction $\mu$ was selected to be greater for reasons of safety.

For block 261 in FIG. 2, a detailed description of an admission pressure estimate in this block was already referred to in FIGS. 9 to 15. The preferred embodiment of the admission pressure estimate in block 261 of FIGS. 2, 3 and 4 results from a power consumption of a pump motor and a volume balance of the pressure medium, the brake fluid, in particular, as a substitute for a pressure sensor for brake control system applications or systems for influencing the braking effect (ABS, TCS, ESP, etc.). Admission pressure information is generally necessary for the aforementioned wheel braking pressure estimate but also for the vehicle dynamics control in general, for example. The basic idea of this pressure estimate, the admission pressure estimate, in particular, is that the required current of the pump motor during the reduction phase of the control represents a measure of the volume of pressure medium delivered and the available admission pressure pvor.

The admission pressure pvor can then be determined from the pump current and delivery volume information. In addition, FIG. 9 shows a general representation of the admission pressure estimation system. In addition, pressure pvor of the estimate is filtered in it with a time delay system (block 98). To determine the mean value XVmean in a learning phase, only measurements at the time of the start of delivery are evaluated (see FIG. 12). In block 90 of FIG. 9, the total volume V to be delivered is formed and output at block 95. The coefficient of friction $\mu$ and in the case of special brake circuit divisions, in this case for example, the differentiation between front wheel and rear wheel front/rear serve as input values. The volume balance (see FIG. 10) with regard to the particular wheel brake is contained in blocks 91 to 94. Input values in these blocks 91 to 94 are the particular activation signals of the outlet valves AVVL, AVVR, AVHL, AVHR. The volumes of the individual wheels or wheel brakes are then determined from these signals. They are VVL (corresponds to the volume left front), VVR (volume right front), VHL (volume left rear), VHR (volume right rear). The linkage of these volumes in block 99 by summing, for example, produces the total volume V, which is transferred to block 95. The addition of a proportionality factor XVmean and linking with volume V forms a volume factor Vfaktor. Volume factor Vfaktor arises, for example, by forming a quotient of XVmean and volume V. Volume factor V is in turn fed to a block 96 and is linked there with an effective current component Ieff, for example, by multiplication. This results in an estimated admission pressure pvor which can then be additionally transferred to a block 98. A first order delay element is contained in block 98 of this embodiment, as a result of which admission pressure pvorl arises. Effective current component Ieff is formed by linking the starting current IAnlauf and the no-load current ILeer as well as the measured current component IMeβ in block 97. Advantageously, this occurs by subtraction. The general set of initial values on which this FIG. 9 is based will be explained below.

Since it is attempted here to obtain the estimate with a fixed value XVmean, the estimator must be designed in such a way that the variation of proportionality factor XV is kept as low as possible. XVmean is determined with consideration of the following variables that affect the volume balance: temperature T, wheel braking pressure prad (high or low coefficients of adhesion), brake circuit. The selection criterion is the minimization of the estimation error over all operating conditions of the control intervention, the braking operation, for example. Against this backdrop, a compromise is indicated in the determination of XVmean. To avoid underbraking, XVmean is designed in such a way that the pressure estimate is more likely to be too great than too little.

The current needed by pump motor I to deliver is assumed to be directly proportional to delivery volume V and admission pressure pvor.

$$I = f(V, pvor) = \frac{1}{XV} \cdot V \cdot pvor \qquad \text{equa. (1v)}$$

Proportionality factor XV is determined, for example, in advance in a learning phase or laboratory phase from the measured admission pressure; current I is determined according to the formed delivery volume V.

$$XV = V \cdot \frac{pvor}{I} \qquad \text{equa. (2v)}$$

With the learned mean value of proportionality factor XVmean, which is determined in such a way that it is applicable to nearly all braking situations, admission pressure pvor is then estimated during the control intervention.

$$pvor = XVmean \cdot \frac{1}{V} \qquad \text{equa. (3v)}$$

XVmean is determined, for example, during the learning phase according to the following equation:

$$XVmean = \frac{1}{n} \sum_j \frac{pvor(j) \cdot V(j)}{Ieff(j)} \qquad \text{equa. (11v)}$$

where j corresponds to the times of the evaluation and n to the number of the evaluation.

Volume factor Vfaktor is determined from the mean of proportionality factor XVmean, for example, by dividing XVmean by volume V. The variation of proportionality factor XV can be minimized if all determining factors are considered in simulating delivery volume V.

FIG. 10 illustrates in addition the simulation of delivery volume V with a volume model in block 90. In doing so, no complex fluid engineering model is used. Instead, the delivery process from the particular outlet valve such as 211, 212, 211a and 212a via the accumulator to the brake line shall be described with a simple deceleration model. If accumulator 206 or 206a is referred to, the standardized volume balance fabbz in accumulator 206 or 206a can be described temporally in the digital representation as follows:

$$fabbz = \begin{cases} fabbz + uven & \text{as long as outlet valve is open} \\ fabbz & \text{if outlet valve is closed again} \\ pfab \cdot fabbz & \text{from time start } TABBAU \end{cases} \qquad \text{equa. (4v)}$$

The digital representation fabbz=fabbz+uven for each sampling time merely suggests the sum of the reduction times in the reduction phase. At the time the outlet valve is closed, the content of fabbz stays constant and amounts to the value Σ(uven) if fabbz is set to zero at the start of summing, where uven represents the reduction time of the valve (t2–t3 in FIG. 10). The value pfab is represented by $$pfab = \exp\left(-\frac{TA}{TPFAB}\right) \qquad \text{equa. (5v)}$$

TA corresponding to the sampling time and TPFAB to the time constant of delivery by, for example, return pump 203 or 203a. An activation signal AV for an outlet valve (211, 212) is shown representatively in FIG. 10. This valve is in the closed state from t0 to t1, open from t1 to t2 and in the closed state again from time t2 on. This is represented by curve 10. In addition, the volume of the pressure medium in accumulator Vsp over time is shown in FIG. 10. At time t1 when, for example, outlet valve 211 is open, the volume in accumulator 206 is increased from Vsp1 to Vsp2. The difference Vsp2−Vsp1 of volume dvsp is proportional to reduction time TABBAU and corresponds to the delivered volume from one wheel brake. The reduction time of the pressure medium volume in wheel brakes TABBAU is shown from t1 to t3 in FIG. 10. Time t3 to t4 needed by the return pump to empty accumulator 206 corresponds to roughly three times the time constant of the delivery by return pump TPFAB. These interrelationships are shown in curve 11 in FIG. 10.

The volume model can be used for each wheel individually. Front and rear wheels are evaluated with different weight factors fkreisV for front wheels and fkreisH for rear wheels. Since the relationship between reduction time TABBAU and volume Vsp is dependent on the pressure level, an exponential pressure-dependent factor fpressure is introduced in the volume model. This interrelationship is shown in FIG. 11. Curve 12 represents the curve for the rear wheels over time and curve 13 the pressure curve for front wheels. Pressure PμH refers to a high coefficient of friction μ and pressure PμN to a low coefficient of friction μ. The connection between reduction time TABBAU and volume Vsp as a function of the pressure level is made clear in FIG. 11 by the slopes. These different slopes are represented in the slope triangles at t02, t03, t04 and t05, the slope triangles at t02 and t03 corresponding to a high coefficient of friction μ and the slope triangles at t04 and t05 corresponding to a low coefficient of friction μ, corresponding to PμN. The selection of equal time spans Δt of the one side of the slope triangles makes the influence of the pressure level clear. In addition, this interrelationship may also be temperature-dependent with regard to the viscosity of the brake fluid. This will be explained in greater detail below with reference to FIGS. 13 to 15. The total volume V to be delivered can then be determined, for example, by summing in element 99 of FIG. 9.

$V=VVL+VVR+VHL+VHR$ where $VVL=fabbzVL\cdot fkreisV\cdot fpressureVL$ $VVR=fabbzVR\cdot fkreisV\cdot fpressureVR$ $VHL=fabbzHL\cdot fkreisH\cdot fpressureHL$ $VHR=fabbzHR\cdot fkreisH\cdot fpressureHR$ equa. (7v)

In the symbols assigned to the individual values fabbz, fkreis and fpressure, V signifies front, H rear, L left and R right. VVL, VVR, VHL and VHR are the volumes delivered to the individual wheel brakes and when summed produce the total volume V.

As shown in FIG. 12, the total current of pump motor I contains the starting current IAnlauf and the no-load current ILeer when under no load. For that reason, current I should not be used directly for the admission pressure estimate. To determine the current component corresponding to delivery, these components IAnlauf and ILeer are deducted from the measured current IMeβ. In FIG. 12, the current is plotted over time. Curve 14 shows the measured current IMeβ, curve 15 the no-load current ILeer with the starting current IAnlauf and curve 16 shows the effective current component Ieff which is used and corresponds to the delivery. Times tb1 to tb9 represent the j times at which the current is evaluated. Until the first evaluation of the current at time tb1, an estimate of the admission pressure must be assumed as a fixed value. The initial braking dynamics of the driver are simulated using time constant TPFP via a first order time delay system in block 98 of FIG. 9. The starting current is again simulated with a simple set of initial values. This estimate is specified in equation 9v.

$$IAnlauf = \begin{cases} IAnlauf + \frac{Iampl}{Tlang} & \text{during start} \\ q1 \cdot IAnlauf & \text{during decay} \end{cases} \quad \text{equa. (9v)}$$

Where Iampl is the peak of the starting current and Tlang corresponds to a time increment. The value Q1 during decay is represented by an exponential function with TPFI of time constant of the decay and TA of the sampling time.

$$q1 = \exp\left(-\frac{TA}{TPFI}\right) \quad \text{equa. (10v)}$$

The temperature compensation with respect to the viscosity of the brake fluid which was already mentioned above is shown in FIGS. 13 to 15. The selection of the mean of proportionality factor XVMean in the learning phase is based on the measurements, for example, in a possible temperature range of 20° to 35° C. For control interventions, braking operations in another temperature range or other temperature ranges, in particular, XVmean must be adjusted accordingly so that temperature T's influence on the estimate is compensated. The starting point for this is the temperature dependence of the estimating precision in FIG. 13. The error of estimation SF is plotted according to the difference of the estimated and measured admission pressure pvor divided by the measured admission pressure over temperature T, control interventions, braking operations with different braking pressures, in particular, being evaluated separately in two groups. Thus curve 17 represents error of estimation 1 in a first pressure range, from 100 to 200 bar, for example, and curve 18 represents an error of estimation 2 in a second pressure range from 25 to 50 bar, for example. Thus the error of estimation is greatest at low temperatures and high pressure. Two methods can now be used to compensate the error of estimation.

The first method is explained with reference to FIG. 14. In it, proportionality factor XV is shown as a function of admission pressure pvor and temperature T. Mean XVmean is shown in the same dependency relation in the same FIG. 14. To compensate the error of estimation which is brought about by the temperature, the mean XVmean must be made temperature-dependent. The representation in FIG. 13 evokes the idea that proportionality factor XV tends to change according to the temperature, as shown in FIG. 14. In addition, curve 21 shows proportionality factor XV in a first higher temperature range (20° to 35° C., for example) and curve 23 shows proportionality factor XV in a second lower temperature range (from −20° to 10° C., for example). Curves and 22 then show the mean of the proportionality factor at both a higher (as above, 20° to 35° C.) and at a lower (−20° to 10° C.) This means that the mean XVmean can be corrected accordingly in the direction of the correct value of proportionality factor XV as a function of temperature. For example, the interrelationship between XVmean and the temperature is learned in advance. From the temperature determination, the appropriate XVmean for the pressure estimation is then used for the pressure estimate. The correction of the mean XVmean can be made directly via a temperature sensor used to determine the temperature of the pressure medium. If a temperature sensor is not available, the temperature of the pressure medium can be determined indirectly from the current of the device delivering the pressure medium. The current measurement can be used as a substitute for a temperature sensor. It can be determined from the measurements of the particular control (ABS, TCS, ESP) using the admission pressure estimate for various temperatures that the steady-state no-load current ILeer drops continuously as the temperature increases. This evokes the idea that the temperature can be determined from the current. Thus the temperature and estimation error compensation can be readily accomplished, for example, by specifying a characteristic, a set of characteristics or a characteristics field containing the values of temperature and current. The interrelationship between no-load current and temperature is shown in curve of FIG. 15. The temperature dependence of no-load current ILeer is very similar to that of viscosity Vis, curve 24 in FIG. 15. This leads to the idea that the no-load current is essentially a function of the viscosity of the brake fluid. At low temperatures, the brake fluid is more viscous; therefore more current is required to deliver the same volume. This forms the basis for the idea of using the actual no-load current, which is determined, for example, by forming the minimum of the measured current after the starting phase, directly for the temperature or estimation error compensation. Until now, the no-load current was determined once in a warm motor and then used as a constant in the estimate. For estimation error compensation, no-load current ILeer is determined continuously during the braking operation and used as a variable in the admission pressure estimate. In contrast to the approach using temperature in method 1, the opposite approach is followed here. The information concerning temperature T contained in no-load current ILeer is taken into account in such a way that proportionality factor XV contains the same value over the entire temperature range. The consequence is that the already optimized mean of proportionality factor XVmean has validity for the entire temperature range.

SYMBOLS arad wheel acceleration
ax vehicle deceleration
cp braking torque coefficient
Fkorr correction factor, includes air resistance and slope resistance
g gravitational acceleration
Jrad moment of inertia of the wheel
kab attenuation factor (pressure reducer)
mF vehicle weight
prad wheel pressure
pVkenn valve characteristic
pvor admission pressure
rrad wheel radius
tab time interval between ta and tb
tVent valve activation time
tVent(K) valve activation time at $k^{th}$ sampling time step
vrada wheel speed at time a
vradb wheel speed.at time b
K upper position of center of gravity
Ψ rear axle load
k $k^{th}$ sampling time step
fabbz volume balance

What is claimed is:

1. A method for determining a wheel braking pressure in a braking system, the braking system having an admission pressure, comprising the steps of:
    introducing a pressure medium from a reservoir for the pressure medium into a wheel brake through at least one shutoff device for at least one of an inlet, an outlet and a passage of the pressure medium;
    estimating the admission pressure by estimating a pressure quantity, the pressure quantity representing the admission pressure;
    detecting operating states of the at least one shutoff device for the at least one of the inlet, the outlet and the passage of the pressure medium; and
    determining the wheel braking pressure as a function of at least the estimated admission pressure and the detected operating states.

2. The method according to claim 1, wherein the method for determining the wheel braking pressure is an iterative process according to a model.

3. A method for estimating an admission pressure in a braking system, comprising the steps of:
    introducing a pressure medium from a reservoir for the pressure medium into a wheel brake through at least one shutoff device for at least one of an inlet, an outlet and a passage of the pressure medium;
    removing the pressure medium from the wheel brake via at least one delivery arrangement, the at least one delivery arrangement delivering the pressure medium;
    detecting an operating state quantity for the at least one delivery arrangement;
    estimating a volume of the pressure medium that is delivered by the at least one delivery arrangement; and
    estimating the admission pressure as a function of the operating state quantity and the estimated volume.

4. The method according to claim 3, wherein the step of estimating the admission pressure includes the step of estimating the admission pressure via a volume model.

5. The method according to claim 3, wherein the step of estimating the admission pressure includes the step of estimating the admission pressure as a function of a quantity used as a measure of a rotational speed of the at least one delivery arrangement.

6. The method according to claim 3, wherein the step of estimating the admission pressure includes the step of estimating the admission pressure as a function of a quantity used as a measure of a power consumption of a pump motor.

7. The method according to claim 5, wherein the quantity is a value of a power consumption that corresponds to a power consumption of the at least one delivery arrangement.

8. The method according to claim 3, further comprising the step of:
    checking a plausibility of the estimated admission pressure.

9. The method according to claim 4, wherein the volume model includes a proportionality factor, the proportionality factor including temperature information.

10. The method according to claim 4, wherein the volume model includes a mean of proportionality factors, the mean including at least one proportionality factor, the at least one proportionality factor including temperature information.

11. The method according to claim 4, further comprising the step of:
    comparing, in the volume model, a temperature dependence of a current and a temperature dependence of a viscosity of the pressure medium.

12. The method according to claim 4, further comprising the step of:
    performing an estimation error compensation in the volume model via at least one of a non-recurring inclusion of a current, a constant inclusion of the current and a continuous inclusion of the current.

13. The method according to claim 3, further comprising the step of:
    specifying a coefficient of friction in a first process cycle for estimating the admission pressure.

14. The method according to claim 1, further comprising the step of:
    at least one of specifying and determining an imprecise value of the wheel braking pressure as a guide value in a first process cycle for estimating the wheel braking pressure, from which a more precise value is determined in a subsequent cycle.

15. A device for determining a wheel braking pressure in a braking system, the braking system having an admission pressure, comprising:
    means for introducing a pressure medium from a reservoir for the pressure medium into a wheel brake through at least one shutoff device for at least one of an inlet, an outlet and a passage of the pressure medium;
    means for estimating the admission pressure by estimating a pressure quantity, the pressure quantity representing the admission pressure;
    means for detecting operating states of the at least one shutoff device for the at least one of the inlet, the outlet and the passage of the pressure medium; and
    means for determining the wheel braking pressure as a function of at least the estimated admission pressure and the detected operating states.

16. A device for estimating an admission pressure in a braking system, comprising:
    means for introducing a pressure medium from a reservoir for the pressure medium into a wheel brake through at least one shutoff device for at least one of an inlet, an outlet and a passage of the pressure medium;

means for removing the pressure medium from the wheel brake via at least one delivery arrangement, the at least one delivery arrangement delivering the pressure medium;

means for detecting an operating state quantity for the at least one delivery arrangement;

means for estimating a volume of the pressure medium that is delivered by the at least one delivery arrangement; and means for estimating the admission pressure as a function of the operating state quantity and the estimated volume.

* * * * *